United States Patent [19]

Connor et al.

[11] 4,237,850
[45] Dec. 9, 1980

[54] SYSTEM FOR HEATING FUEL OIL

[75] Inventors: Frank G. Connor, Delano; Billy B. R. Veach, Maple Plain, both of Minn.

[73] Assignee: Nationwide Carriers Incorporated, Maple Plain, Minn.

[21] Appl. No.: 20,025

[22] Filed: Mar. 13, 1979

[51] Int. Cl.³ ............................................. F02M 31/00
[52] U.S. Cl. .................................................... 123/557
[58] Field of Search ................ 123/122 E, 133, 142.5; 261/145, 144

[56] References Cited
U.S. PATENT DOCUMENTS

| | | | |
|---|---|---|---|
| 1,266,429 | 5/1918 | D'Orville | 123/122 E |
| 3,699,938 | 10/1972 | Frazier | 123/122 E |
| 3,929,187 | 12/1975 | Hurner | 123/122 E |
| 3,989,019 | 11/1976 | Brandt | 123/122 E |

Primary Examiner—Ronald H. Lazarus
Attorney, Agent, or Firm—Merchant, Gould, Smith, Edell, Welter & Schmidt

[57] ABSTRACT

A mechanism (10) for heating diesel fuel in a diesel engine vehicle is disclosed. The mechanism (10) includes a heat exchange conduit (18), a portion of which is adapted to be held in the interior of a fuel tank (12) of a diesel engine (16). An inlet conduit (42) connects an inlet end (30) of the heat exchange conduit (18) to a water manifold (44) of the diesel engine (16). An outlet conduit (46) connects an outlet end (32) of the heat exchange conduit (18) to the engine block (48) of the diesel engine (16). In this manner, coolant liquid from the diesel engine (16) is passed through the heat exchange conduit (18) to heat diesel fuel contained in the fuel tank (12).

2 Claims, 5 Drawing Figures

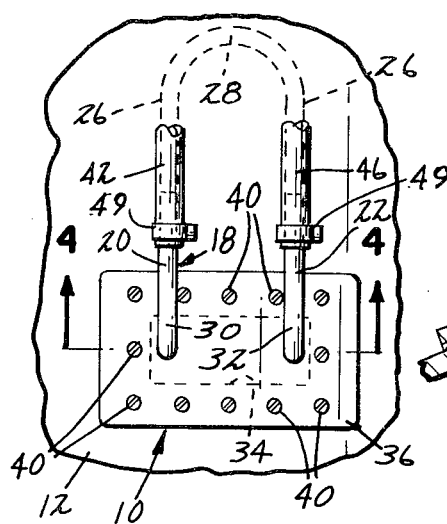
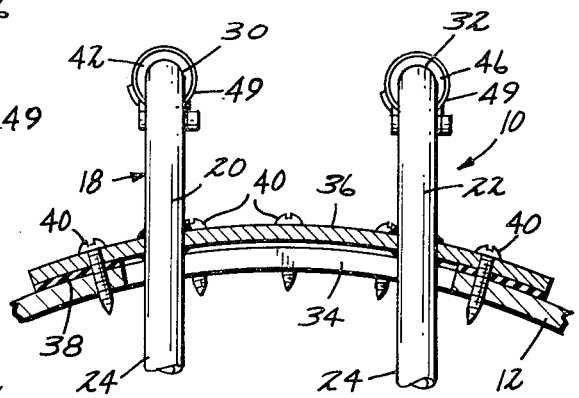
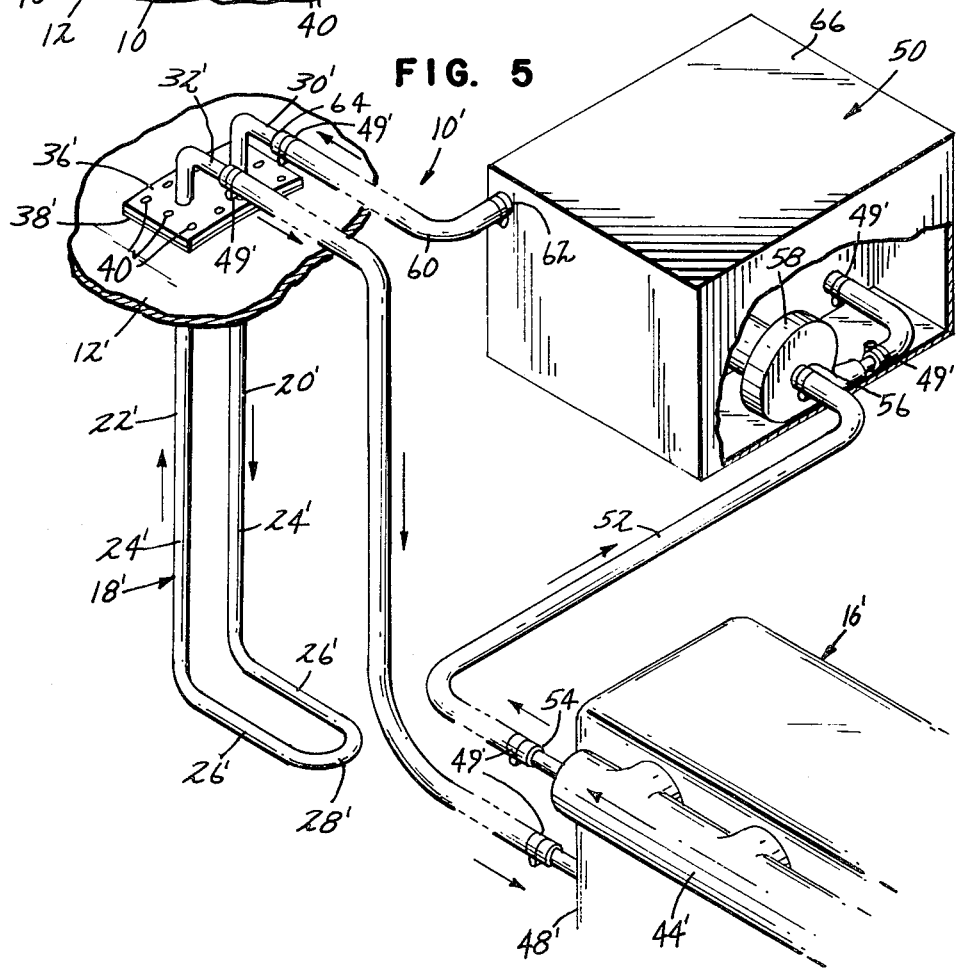

SYSTEM FOR HEATING FUEL OIL

TECHNICAL FIELD

The present invention relates broadly to devices for heating fuel oil prior to their passage to a combustion chamber. More specifically, the present invention relates to a heating system which heats diesel fuel within the fuel tank carried by a diesel engine vehicle.

BACKGROUND OF THE PRIOR ART

Diesel fuel, particularly No. 2 fuel oil, has the tendency to jell or "wax" in cold weather. This jelling of diesel fuel is a particularly acute problem in the trucking industry during the winter months in the northern portion of the United States and throughout Canada. During the winter months, temperatures and wind chill factors frequently reach minus 30° F. in these areas. In such a temperature and wind chill range, diesel fuel tends to jell or wax both in the fuel tank itself and within the fuel line leading from the tank to the engine. In the severest incidence of jelling, the diesel engine completely fails. The truck thus must be towed to a service area and the fuel tank heated. The towing and down time of the truck results in increased transportation costs. In less severe instances, the jelling can result in loss of power so that the trucks are forced to travel at a slow rate of speed. This also results in increased transportation costs.

Numerous methods and apparatus have been used in the past in an attempt to solve this problem. A heating mechanism interposed in the fuel supply line from the fuel tank to the engine is one of the more frequently used mechanisms. U.S. Pat. No. 3,929,187 issued to Edwin E. Hurner illustrates such a mechanism. The device disclosed in the Hurner patent utilizes the heated water or coolant from the engine to supply heat to a heat exchanger through which a fuel line passes. Another prior art mechanism consists of a fuel filter which also serves as a heat exchanger to heat the fuel passing therethrough. Both of the above heat exchangers are relatively complex and, hence, expensive structures to produce. Also, since these heat exchange devices are disposed within the path of the fuel line and not within the fuel tank itself, they do not prevent the jelling or "waxing" of the diesel fuel within the fuel tank.

The mixing of different types of fuel, as well as the use of additives to the fuel have also been attempted in an effort to prevent the jelling of diesel fuel at low temperatures. The use of additives requires that the additives be added at appropriate times and in appropriate amounts. Also, the additives tend to cause additional wear on the diesel engines.

Another method utilized in the prior art to prevent the jelling of the fuel within a diesel fuel tank was by passing a portion of the exhaust pipe through the gas tank. However, this method does not provide the capability of heating the fuel prior to starting the engine.

SUMMARY OF THE INVENTION

The present invention is directed to a mechanism for heating diesel fuel in a diesel engine vehicle. The mechanism includes a conduit which has an inlet end and an outlet end. A means is provided for attaching the conduit to a fuel tank of a diesel engine vehicle such that a portion of the conduit is disposed in the interior of the fuel tank. The inlet end of the conduit is adapted to be connected in fluid communication with a water manifold of the diesel engine. The outlet end of the conduit is adapted to be connected in fluid communication with an engine block of the diesel engine whereby coolant liquid from the diesel engine is passed through the conduit to heat fuel contained in the fuel tank.

In a preferred embodiment, the conduit is made of rigid tubing which includes a generally linear inlet section and a generally linear outlet section interconnected with one another and extending generally parallel to one another. The inlet and outlet sections each include a first portion adapted to extend generally downward into the fuel tank and a second portion extending transverse thereto and adapted to extend generally lengthwise within the fuel tank. By passing heated coolant through the conduit in the fuel tank, the fuel contained therein is kept at a sufficiently high temperature, even under extreme cold conditions, so that jelling is prevented. For example, in one test of the present invention, when the outside temperature was −30° F., the temperature of the fuel within a fuel tank was kept at approximately 60° F.

In another embodiment of the invention, provision is made to heat the diesel fuel in the fuel tank prior to starting the diesel engine. In this embodiment, a "Southwind" type of heater is interposed between the inlet end of the conduit and the water manifold of the diesel engine. A first portion of inlet tubing extends from the water manifold of the diesel engine to an inlet of the "Southwind" heater. Another portion of the inlet tubing extends between an outlet of the "Southwind" heater and the inlet end of the conduit and passes heated water or coolant liquid to the inlet end of the conduit in the fuel tank. The "Southwind" heater is provided with its own pump to draw water from the water manifold when the diesel engine is not operating. The water is thus drawn to the "Southwind" heater and preheated therein. Since the water heated by the "Southwind" heater passes through the conduit in the fuel tank, the diesel fuel therein is heated prior to starting the engine. Unjelled fuel is thus supplied to the engine when it is started.

Various advantages and features of a novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying description in which there are illustrated and described preferred embodiments of the invention.

BRIEF DESCRIPTION OF THE DRAWINGS

FIG. 3 is a fragmentary plan view as seen from line 3—3 of FIG. 2;

FIG. 4 is an enlarged sectional view taken generally along line 4—4 of FIG. 3;

FIG. 5 is an enlarged perspective view, partially broken away, which schematically illustrates a device in accordance with the present invention utilized with a "Southwind" type of heater.

DETAILED DESCRIPTION OF THE INVENTION

Figure 1:
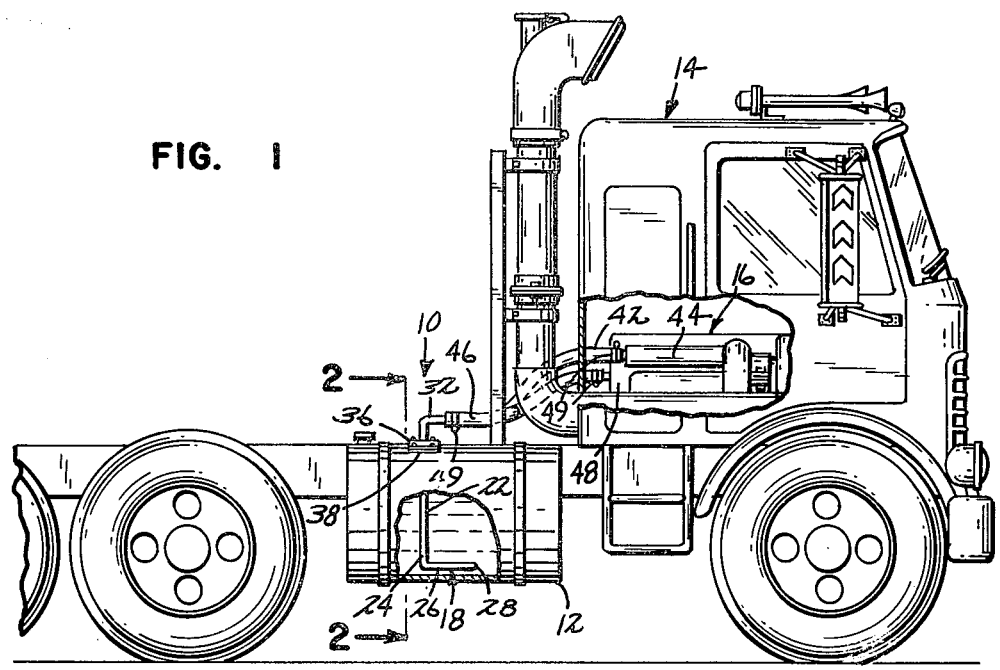
FIG. 1 is a side elevational view, partially broken away, of a tractor-trailer cab utilizing a device in accordance with the present invention.
Figure 2:
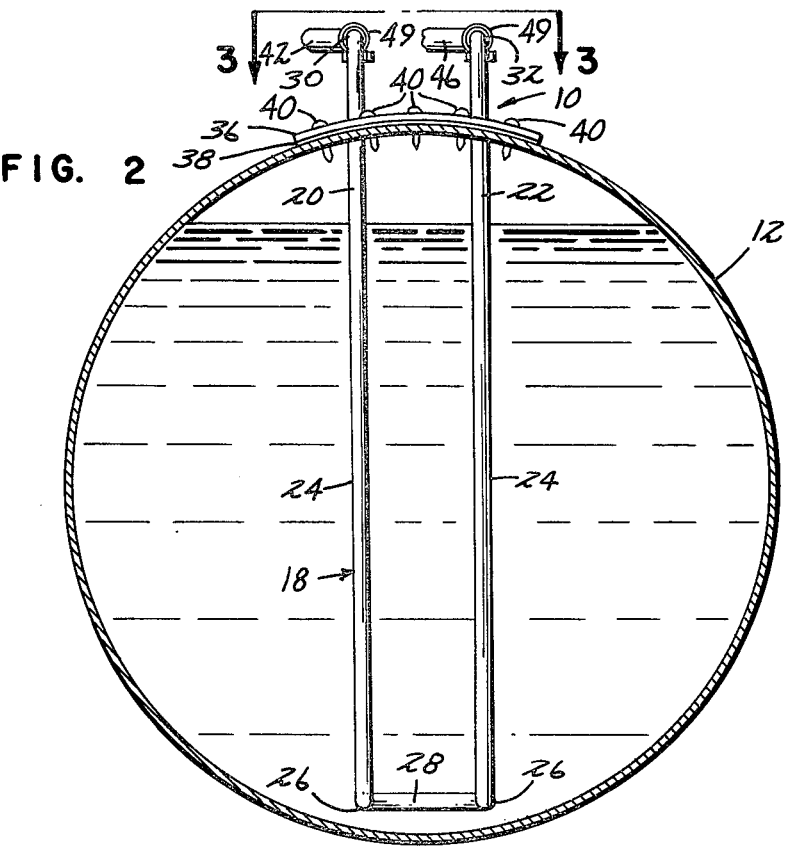
FIG. 2 is an enlarged transverse sectional view taken generally along 2—2 of FIG. 1.

Referring to the drawings in detail, wherein like numerals indicate like elements, there is shown in FIG. 1 a fuel heating device designated generally as 10. The fuel heating device 10 is shown installed with a fuel tank 12. The fuel tank 12 is attached to a conventional tractor-trailer cab 14. The fuel tank 12 is designed to hold diesel-type fuel which is supplied through a fuel line to a diesel engine 16. The heating device 10 includes a heat exchange conduit 18, a portion of which is held within the interior of the fuel tank 12. The conduit 18 is formed of rigid tubing in the shape of a pair of L's extending parallel to one another. The conduit 18 includes an inlet section 20 and outlet section 22. Each section 20, 22 includes a first generally linear extending section 24 and a second generally linear portion 26 extending generally transverse thereto at a lower end of the first portion 24. A generally curved portion 28 of the conduit 18 interconnects the lower portions 26. The first portions 24 extend parallel to one another, as do the second portions 26. An upper end 30 of the inlet section 20 extends out of the tank 12 and forms an inlet end of the tubing 18. An upper end 32 of the outlet section 22 extends out of the tank 12 and forms an outlet end of the tubing 18.

As is best seen in FIGS. 3 and 4, the heat exchange conduit 18 passes through a hole 34 formed through an upper portion of the fuel tank 12. The upper ends 30,32 are secured in a fluid-tight manner within holes in a mounting plate 36. The mounting plate 36 has a generally curved configuration which conforms generally to the shape of the outer surface of the tank 12. A fluid seal 38 is interposed between the outer surface of the tank 12 and the inner surface of the mounting plate 36 about the hole 34. A plurality of machine screws 40 are used to tighten the mounting plate 36 down upon the seal 38 and the tank 12. The heating exchange conduit 18 is thus supported within the fuel tank 12.

As best seen in FIG. 1, the first portion of the inlet section 20 extends generally downwardly within the tank 12 at a location slightly to the rear of the middle of the tank 12 in its lengthwise dimension. The portion 24 of the outlet section 22 is similarly disposed. Also as seen in FIG. 1, the second portion 26 of the inlet section 20 extends generally along the lengthwise dimension of the tank 12 adjacent its bottom and extends on either side of the center thereof. The second portion 26 of the outlet section 22 is similarly disposed. This particular disposition of the heat exchange conduit 18 within the tank 12 has been found particularly advantageous.

An inlet conduit 42 has one of its ends connected in fluid communication to the inlet end 30 of the heat exchange conduit 18 and its other end connected to a water manifold 44 of the diesel engine 16. The water manifold 44 is in turn connected in fluid communication to a water pump such that water is forced or pumped from the manifold 44 through the conduit 42 to the conduit 18. An outlet conduit 46 has one of its ends connected t the outlet end 32 of the heat exchange conduit 18 and its other end connected to a portion of the engine block 48 of the diesel engine 16. Water or coolant liquid thus flows back to the engine 16 through the conduit 46. The conduits 42, 46 are preferably formed of a flexible material and are secured at their ends to the conduit 18, the water manifold 44, and the engine block 48 by conventional clamps 49.

Another embodiment of a fuel heating device is shown in FIG. 5 and is designated generally as 10'. Elements of the device 10' which are similar to elements of the device 10 will be indicated by like primed numerals. The device 10' is illustrated in use with a conventional "Southwind" type of heater 50. The "Southwind" heater 50 is a standard type of heating device and is, therefore, shown only schematically. In the device 10', the coolant liquid does not flow directly through a single conduit to the inlet end 30' of the heat exchange conduit 18', but rather is first passed through the "Southwind" heater 50. A first inlet conduit 52 has an inlet end 54 connected in fluid communication with the water manifold 44' and an outlet end 56 connected in a fluid communication with a fluid pump 58 of the "Southwind" heater 50. A second inlet conduit 60 has an inlet end 62 connected in fluid communication with an outlet of the "Southwind" heater 50 and an outlet end 64 connected in a fluid communication with the inlet end 30' of the heat exchange conduit 18'.

The device 10' operates in the following manner. When the diesel engine 16' and the coolant liquid therein are at a very low temperature such that starting of the engine 16' would be difficult, the "Southwind" heater 50 is activated. A fluid pump 58 of the "Southwind" heater draws the coolant liquid from the water manifold 44' and through the conduit 52 to a heating section not shown but contained within the housing 66 of the "Southwind" heater 50. The heated coolant liquid is thereafter forced by the pump 58 out of the "Southwind" heater 50 through the conduit 60 and into and through the heat exchange conduit 18'. Fluid contained in the fuel tank 12' within which the heat exchange conduit 18' is disposed is thereby also heated. Thereafter, the coolant liquid is returned to the engine block 48' via the conduit 46. Once the engine 16' is started, the "Southwind" heater 50 is shut down. The pump 58 is thus shut off, as is the heater of the heating section 66. Thereafter, the coolant liquid is forced through the conduit 52, the south wind heater 50, and the conduit 60 to the heat exchange conduit 18' under the force of the water pump of the engine 16'.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

We claim:

1. A system for heating diesel fuel in a diesel engine vehicle to prevent the jelling of the diesel fuel comprising:

a fuel tank for holding diesel fuel, said fuel tank having top, bottom and side portions, an access opening formed through the top portion of said fuel tank;

a heat exchange conduit comprised of a length of rigid tubing passing into and out of said fuel tank through said access opening, said rigid tubing including an inlet section and an outlet section interconnected to one another and extending generally parallel to one another, said inlet and outlet sections each including a first portion extending generally downward into the fuel tank and a second portion transverse thereto and extending adjacent the bottom portion of said fuel tank;

a mounting plate extending over said access opening and being attached to the top portion of said fuel tank, an upper end of the inlet section and the outlet section of said rigid tubing each passing through and being attached to a hole through mounting plate; and conduit means for connecting said heat exchange conduit to the diesel engine, said conduit means including an inlet conduit having a first end connected in fluid communication to the inlet section of said heat exchange conduit and a second end connected in fluid communication with a water manifold of said engine, and an outlet conduit having a first end connected to the outlet section of said heat exchange conduit and a second end connected to an engine block of said engine whereby heated coolant liquid in said diesel engine is passed through said heat exchange conduit to heat diesel fuel contained in said fuel tank.

2. A system in accordance with claim 1 including an independent water heater and pump interposed in fluid communication with said inlet conduit between said heat exchange conduit means and said water manifold.

* * * * *